US012405703B2

(12) United States Patent
Peck et al.

(10) Patent No.: US 12,405,703 B2
(45) Date of Patent: Sep. 2, 2025

(54) DIGITAL ASSISTANT INTERACTIONS IN EXTENDED REALITY (71) Applicant: Apple Inc., Cupertino, CA (US)

(72) Inventors: Jessica J. Peck, Morgan Hill, CA (US); James N. Jones, San Francisco, CA (US); Ieyuki Kawashima, Pleasanton, CA (US); Lynn I. Streja, San Francisco, CA (US); Stephen O. Lemay, Palo Alto, CA (US); William A. Sorrentino, III, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 18/278,372

(22) PCT Filed: Feb. 22, 2022

(86) PCT No.: PCT/US2022/017343
§ 371 (c)(1),
(2) Date: Aug. 22, 2023

(87) PCT Pub. No.: WO2022/182668
PCT Pub. Date: Sep. 1, 2022

(65) Prior Publication Data
US 2024/0134492 A1  Apr. 25, 2024
US 2024/0231558 A9  Jul. 11, 2024

Related U.S. Application Data (60) Provisional application No. 63/152,723, filed on Feb. 23, 2021.

(51) Int. Cl.
*G06F 3/04815* (2022.01)
*G06F 3/01* (2006.01)
*G10L 15/22* (2006.01)

(52) U.S. Cl.
CPC .......... *G06F 3/04815* (2013.01); *G06F 3/013* (2013.01); *G06F 3/017* (2013.01); *G10L 15/22* (2013.01); *G10L 2015/223* (2013.01)

(58) Field of Classification Search
CPC ...... G06F 3/04815; G06F 3/013; G06F 3/017; G06F 3/167; G10L 15/22; G10L 2015/223; G06T 19/006; G06T 11/00
See application file for complete search history.

(56) References Cited

U.S. PATENT DOCUMENTS 9,210,413 B2  12/2015  Grinberg et al.
9,865,091 B2  1/2018  Giraldi et al.
(Continued)

FOREIGN PATENT DOCUMENTS

CN  112204507 A  1/2021
EP  3336805 A1  6/2018
(Continued)

OTHER PUBLICATIONS

NPL Video Titled "Augmented Reality on Your Television", published 2018, available for viewing at: https://www.youtube.com/watch?v=lpj90PkfPJ8; select screenshots included. (Year: 2018).*
(Continued)

*Primary Examiner* — Daniel F Hajnik
*Assistant Examiner* — Thomas John Foster
(74) *Attorney, Agent, or Firm* — DLA Piper LLP (US)

(57) ABSTRACT

An example process includes while displaying, on a display, an extended reality (XR) environment: receiving a user input; sampling, with a microphone, a user speech input; in accordance with a determination that the user input satisfies a criterion for initiating a digital assistant, initiating the digital assistant, including: displaying, within the XR environment, a digital assistant indicator at a first location of the XR environment; and while displaying the digital assistant
(Continued)

indicator at the first location, providing, by the digital assistant, a response to the user speech input; after providing the response, ceasing to display the digital assistant indicator at the first location; and in accordance with ceasing to display the digital assistant indicator at the first location, displaying the digital assistant indicator at a second location of the XR environment, the second location corresponding to a physical location of an external electronic device implementing a second digital assistant.

44 Claims, 5 Drawing Sheets (56) References Cited

U.S. PATENT DOCUMENTS

| | | | |
|---|---|---|---|
| 10,373,381 | B2 | 8/2019 | Nuernberger et al. |
| 10,416,760 | B2 | 9/2019 | Burns et al. |
| 10,684,703 | B2 | 6/2020 | Hindi et al. |
| 10,725,629 | B2 | 7/2020 | Badr et al. |
| 11,009,970 | B2 | 5/2021 | Hindi et al. |
| 2012/0249741 | A1 | 10/2012 | Maciocci et al. |
| 2015/0235434 | A1 | 8/2015 | Miller et al. |
| 2016/0370970 | A1* | 12/2016 | Chu .................. G06F 3/011 |
| 2017/0287215 | A1 | 10/2017 | Lalonde et al. |
| 2018/0007210 | A1 | 1/2018 | Todasco |
| 2018/0045963 | A1 | 2/2018 | Hoover et al. |
| 2018/0157333 | A1 | 6/2018 | Ross et al. |
| 2018/0233147 | A1 | 8/2018 | Tukka et al. |
| 2018/0300952 | A1 | 10/2018 | Evans et al. |
| 2018/0352070 | A1 | 12/2018 | Eichfeld |
| 2019/0026936 | A1* | 1/2019 | Gorur Sheshagiri ....................... G06F 3/0304 |
| 2019/0065027 | A1 | 2/2019 | Hauenstein et al. |
| 2019/0221215 | A1 | 7/2019 | Mixter et al. |
| 2019/0227694 | A1 | 7/2019 | Shin et al. |
| 2019/0332400 | A1 | 10/2019 | Spoor et al. |
| 2019/0384389 | A1 | 12/2019 | Kim et al. |
| 2020/0098362 | A1 | 3/2020 | Piernot et al. |
| 2020/0193997 | A1 | 6/2020 | Piernot et al. |
| 2020/0218074 | A1 | 7/2020 | Hoover et al. |
| 2020/0226823 | A1 | 7/2020 | Stachniak et al. |
| 2021/0090567 | A1 | 3/2021 | Tukka et al. |
| 2021/0216134 | A1 | 7/2021 | Fukunaga et al. |
| 2021/0295602 | A1 | 9/2021 | Scapel et al. |
| 2021/0390955 | A1 | 12/2021 | Piernot et al. |
| 2022/0012923 | A1* | 1/2022 | Lebeck ............... G06F 3/14 |
| 2022/0155861 | A1 | 5/2022 | Myung et al. |
| 2022/0198758 | A1 | 6/2022 | Laaksonen et al. |
| 2022/0206298 | A1 | 6/2022 | Goodman |
| 2022/0215630 | A1 | 7/2022 | Solanki et al. |
| 2024/0319959 | A1 | 9/2024 | Peck et al. |

FOREIGN PATENT DOCUMENTS

| | | | | |
|---|---|---|---|---|
| KR | 20170075625 | A | * 3/2017 | ......... H04N 21/4131 |
| WO | 2019/079826 | A1 | 4/2019 | |

OTHER PUBLICATIONS

Applicant-Initiated Interview Summary received for U.S. Appl. No. 18/278,369, mailed on Dec. 23, 2024, 3 pages.

Final Office Action received for U.S. Appl. No. 18/278,369, mailed on Nov. 25, 2024, 18 pages.

International Preliminary Report on Patentability received for PCT Patent Application No. PCT/US2022/017343, mailed on Sep. 7, 2023, 11 pages.

International Search Report and Written Opinion received for PCT Patent Application No. PCT/US2022/017343, mailed on Jun. 13, 2022, 17 pages.

Non-Final Office Action received for U.S. Appl. No. 18/278,369, mailed on Jul. 16, 2024, 18 pages.

Office Action received for European Patent Application No. 22713782.5, mailed on Jul. 1, 2024, 9 pages.

Notice of Allowance received for U.S. Appl. No. 18/278,369, mailed on Jan. 23, 2025, 9 pages.

Result of Consultation received for European Patent Application No. 22713782.5, mailed on Jan. 17, 2025, 3 pages.

Intention to Grant received for European Patent Application No. 22713782.5, mailed on Apr. 17, 2025, 9 pages.

International Preliminary Report on Patentability received for PCT Patent Application No. PCT/US2022/017500, mailed on Sep. 7, 2023, 9 pages.

International Search Report and Written Opinion received for PCT Patent Application No. PCT/US2022/017500, mailed on Jun. 1, 2022, 12 pages.

Examiner-Initiated Interview Summary received for U.S. Appl. No. 18/278,369, mailed on Aug. 14, 2024, 3 pages.

Office Action received for European Patent Application No. 22713782.5, mailed on Nov. 21, 2024, 9 pages.

Office Action received for European Patent Application No. 22713784.1, mailed on Feb. 21, 2025, 8 pages.

Result of Consultation received for European Patent Application No. 22713782.5, mailed on Feb. 4, 2025, 3 pages.

* cited by examiner

DIGITAL ASSISTANT INTERACTIONS IN EXTENDED REALITY

CROSS REFERENCE TO RELATED APPLICATIONS

This application is a U.S. National Stage Patent Application of PCT Application No. PCT/US2022/017343, entitled "DIGITAL ASSISTANT INTERACTIONS IN EXTENDED REALITY," filed on Feb. 22, 2022, which claims priority to U.S. Patent Application No. 63/152,723, entitled "DIGITAL ASSISTANT INTERACTIONS IN EXTENDED REALITY," filed on Feb. 23, 2021. The contents of each of these applications are hereby incorporated by reference in their entireties.

FIELD

This relates generally to using digital assistants with extended reality technologies.

BACKGROUND

Digital assistants may allow users to interact with devices using natural language input in spoken or text form. For example, a user can provide a speech input including a user request to a digital assistant operating on an electronic device. The digital assistant can determine the user's intent from the speech input and determine a corresponding task. The digital assistant can perform the task by executing one or more services of the electronic device to provide an output responsive to the user request.

SUMMARY

Example methods are disclosed herein. An example method includes: while displaying, on a display of an electronic device, an extended reality (XR) environment: receiving, from a user, a user input; sampling, with a microphone of the electronic device, a user speech input; in accordance with a determination that the user input satisfies a criterion for initiating a digital assistant, initiating the digital assistant, including: displaying, within the XR environment, a digital assistant indicator at a first location of the XR environment; and while displaying the digital assistant indicator at the first location, providing, by the digital assistant, a response to the user speech input; after providing the response, ceasing to display the digital assistant indicator at the first location; and in response to ceasing to display the digital assistant indicator at the first location, displaying the digital assistant indicator at a second location of the XR environment, the second location corresponding to a physical location of an external electronic device implementing a second digital assistant.

Example non-transitory computer-readable media are disclosed herein. An example non-transitory computer-readable storage medium stores one or more programs. The one or more programs comprise instructions, which when executed by one or more processors of an electronic device having a display and a microphone, cause the electronic device to: while displaying, on the display, an extended reality (XR) environment: receive, from a user, a user input; sample, with the microphone, a user speech input; in accordance with a determination that the user input satisfies a criterion for initiating a digital assistant, initiate the digital assistant, including: displaying, within the XR environment, a digital assistant indicator at a first location of the XR environment; and while displaying the digital assistant indicator at the first location, providing, by the digital assistant, a response to the user speech input; after providing the response, cease to display the digital assistant indicator at the first location; and in response to ceasing to display the digital assistant indicator at the first location, display the digital assistant indicator at a second location of the XR environment, the second location corresponding to a physical location of an external electronic device implementing a second digital assistant.

Example electronic devices are disclosed herein. An example electronic device comprises a display, a microphone, one or more processors; a memory; and one or more programs, where the one or more programs are stored in the memory and configured to be executed by the one or more processors, the one or more programs including instructions for: while displaying, on the display, an extended reality (XR) environment: receiving, from a user, a user input; sampling, with the microphone, a user speech input; in accordance with a determination that the user input satisfies a criterion for initiating a digital assistant, initiating the digital assistant, including: displaying, within the XR environment, a digital assistant indicator at a first location of the XR environment; and while displaying the digital assistant indicator at the first location, providing, by the digital assistant, a response to the user speech input; after providing the response, ceasing to display the digital assistant indicator at the first location; and in response to ceasing to display the digital assistant indicator at the first location, displaying the digital assistant indicator at a second location of the XR environment, the second location corresponding to a physical location of an external electronic device implementing a second digital assistant.

An example electronic device comprises, means for: while displaying, on a display of the electronic device, an extended reality (XR) environment: receiving, from a user, a user input; sampling, with the microphone of the electronic device, a user speech input; in accordance with a determination that the user input satisfies a criterion for initiating a digital assistant, initiating the digital assistant, including: displaying, within the XR environment, a digital assistant indicator at a first location of the XR environment; and while displaying the digital assistant indicator at the first location, providing, by the digital assistant, a response to the user speech input; after providing the response, ceasing to display the digital assistant indicator at the first location; and in response to ceasing to display the digital assistant indicator at the first location, displaying the digital assistant indicator at a second location of the XR environment, the second location corresponding to a physical location of an external electronic device implementing a second digital assistant.

Displaying the digital assistant indicator at the second location can provide, to a user immersed in an XR experience, the impression of a digital assistant being present at (or near) a physical location known to the user (e.g., the location of the external electronic device). Indicating the presence of a digital assistant at a known physical location can improve the user's spatial awareness of their physical environment and enable intuitive and efficient interactions with the digital assistant. For example, to initiate an interaction with the digital assistant, the user can issue a spoken request to the digital assistant while facing the known physical location. The user is not required to provide other inputs to initiate the interaction (e.g., inputs explicitly indicating to initiate a digital assistant such as a spoken trigger). In this manner, the user-device interface is made more efficient and accurate (e.g., by reducing the time and inputs required to initiate digital assistant interactions, by accurately initiating digital assistant interactions when desired, by reducing user inputs to disable incorrectly initiated digital assistant interactions), which, additionally, reduces power usage and improves battery life of the device.

DESCRIPTION

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 1A:
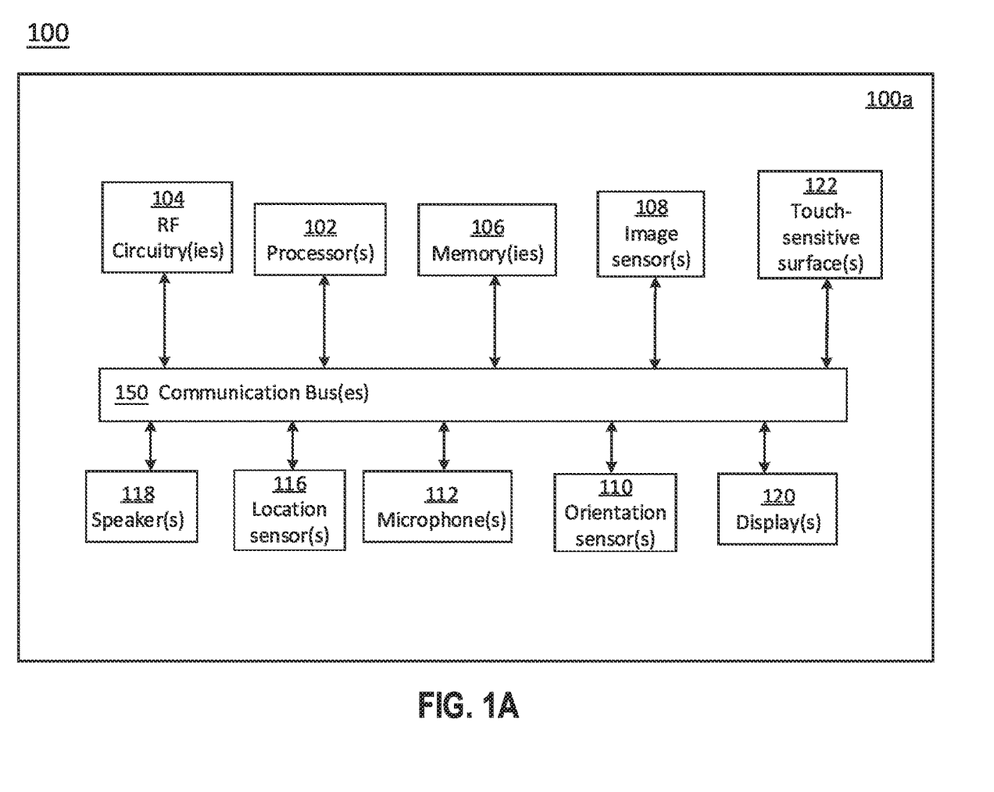
FIGS. 1A-1B depict exemplary systems for use in various extended reality technologies.
Figure 1B:
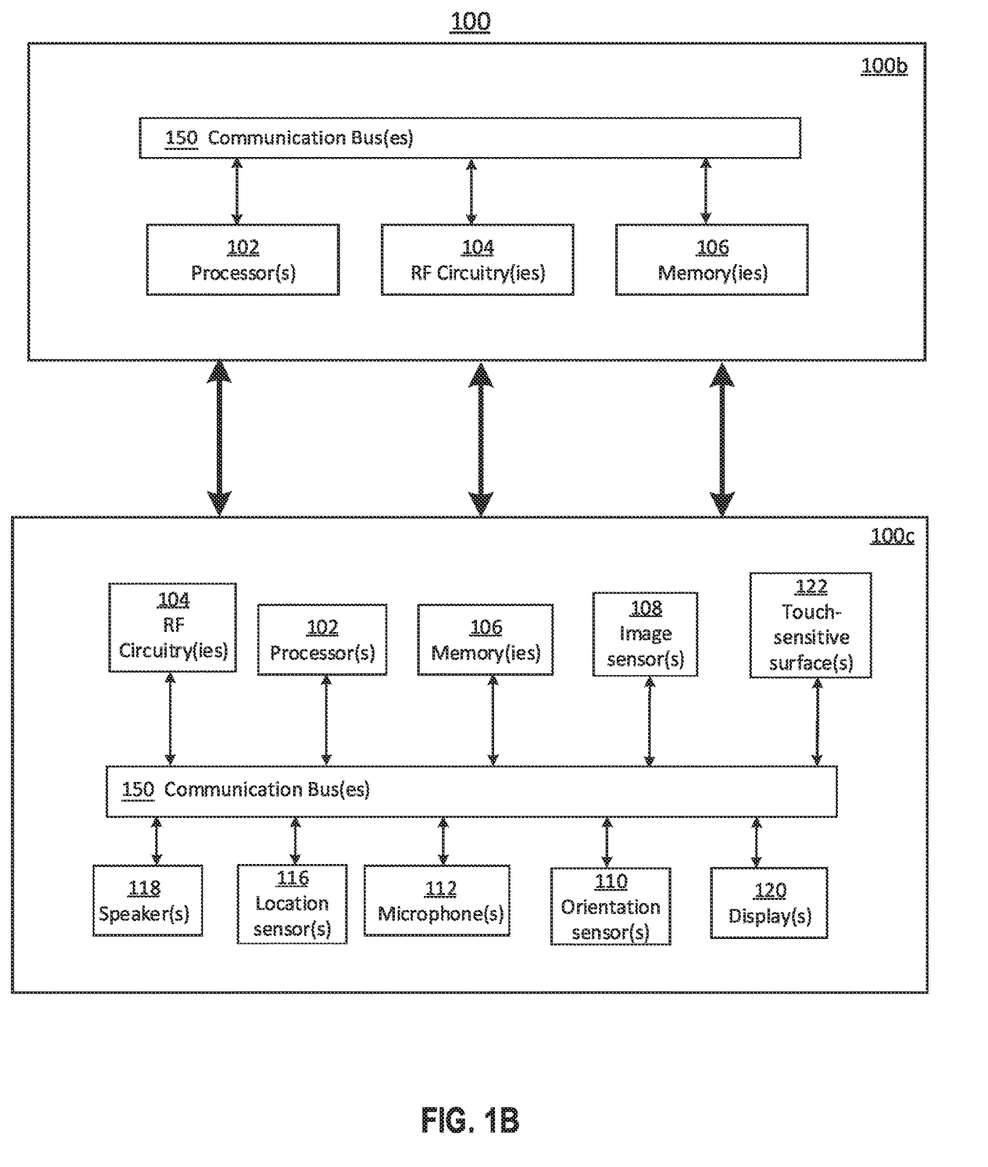

FIGS. 1A-1B depict exemplary system 100 for use in various extended reality technologies.

As shown in FIG. 1A, system 100 includes device 100*a*. Device 100*a* includes RF circuitry(ies) 104, processor(s) 102, memory(ies) 106, image sensor(s) 108, touch-sensitive surface(s) 122, speaker(s) 118, location sensor(s) 116, microphone(s) 112, orientation sensor(s) 110, and display(s) 120. These components optionally communicate using communication bus(es) 150 of device 100*a*.

In some examples, a base station device (e.g., a computing device, such as a remote server, mobile device, or laptop) implements some components of system 100 and a second device (e.g., a head-mounted device) implements other components of system 100. In some examples, device 100*a* is implemented in a base station device or in a second device.

As shown in FIG. 1B, in some examples, system 100 includes two or more devices in communication, e.g., via a wired connection or a wireless connection. First device 100*b* (e.g., a base station device) includes memory(ies) 106, RF circuitry(ies) 104, and processor(s) 102. Such components optionally communicate using communication bus(es) 150 of device 100*b*. Second device 100*c* (e.g., a head-mounted device) includes components such as RF circuitry(ies) 104, processor(s) 102, memory(ies) 106, image sensor(s) 108, touch-sensitive surface(s) 122, speaker(s) 118, location sensor(s) 116, microphone(s) 112, orientation sensor(s) 110, and display(s) 120. These components optionally communicate using communication bus(es) 150 of device 100*c*.

System 100 includes RF circuitry(ies) 104. RF circuitry(ies) 104 optionally include circuitry for communicating with networks (e.g., the Internet, a wireless network (e.g., such as cellular networks and wireless local area networks (LANs)), and/or intranets) and/or electronic devices. RF circuitry(ies) 104 optionally includes circuitry for communicating using near-field communication and/or short-range communication (e.g., Bluetooth®).

System 100 includes processor(s) 102 and memory(ies) 106. Processor(s) 102 include one or more graphics processors, one or more general processors, and/or one or more digital signal processors. In some examples, memory(ies) 106 are one or more non-transitory computer-readable storage mediums (e.g., random access memory, flash memory) storing computer-readable instructions configured to be executed by processor(s) 102 to perform the techniques described below.

System 100 includes image sensor(s) 108. Image sensors(s) 108 optionally include one or more infrared (IR) sensor(s), e.g., a passive IR sensor or an active IR sensor, to detect infrared light from the physical environment. For example, an active IR sensor includes an IR emitter (e.g., an IR dot emitter) for emitting infrared light into the physical environment. Image sensor(s) 108 also optionally include one or more visible light image sensors, such as complementary metal-oxide-semiconductor (CMOS) sensors and/or charged coupled device (CCD) sensors capable of obtaining images of physical elements from the physical environment. Image sensor(s) 108 also optionally include one or more event camera(s) configured to capture movement of physical elements in the physical environment. Image sensor(s) 108 also optionally include one or more depth sensor(s) capable of detecting the distance of physical elements from system 100. In some examples, system 100 uses IR sensors, CCD sensors, event cameras, and depth sensors together to detect the physical environment around system 100. In some examples, image sensor(s) 108 include first and second image sensors. The first and second image sensors are optionally capable of capturing images of physical elements in the physical environment from two respective different perspectives. In some examples, system 100 uses image sensor(s) 108 to detect the position and orientation of system 100 and/or display(s) 120 in the physical environment. For example, system 100 uses image sensor(s) 108 to track the position and orientation of display(s) 120 relative to one or more fixed elements in the physical environment. In some examples, image sensor(s) 108 are capable of receiving user inputs, such as hand gestures.

In some examples, system 100 includes touch-sensitive surface(s) 122 for receiving user inputs, such as tapping or swiping inputs. In some examples, touch-sensitive surface(s) 122 and display(s) 120 are combined into touch-sensitive display(s).

In some examples, system 100 includes microphones(s) 112. System 100 uses microphone(s) 112 to detect sound from the user's physical environment or from the user. In some examples, microphone(s) 112 includes a microphone array (e.g., including a plurality of microphones) that optionally operate together, e.g., to locate the spatial source of sound from the physical environment or to identify ambient noise.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as relative to physical elements in the physical environment. Orientation sensor(s) 110 optionally include gyroscope(s) and/or accelerometer(s).

System 100 includes display(s) 120. Display(s) 120 may operate with a transparent or semi-transparent displays (and optionally with one or more imaging sensors). Display(s) 120 may include an opaque display. Display(s) 120 may allow a person to view a physical environment directly through the display, and may also allow addition of virtual content to the person's field of view, e.g., by superimposing virtual content over the physical environment. Display(s) 120 may implement display technologies such as a digital light projector, a laser scanning light source, LEDs, OLEDs, liquid crystal on silicon, or combinations thereof. Display(s) 120 can include substrates through which light is transmitted, e.g., optical reflectors and combiners, light waveguides, holographic substrates, or combinations thereof. As a particular example, the transparent or semi-transparent display may selectively transition between a transparent or semi-transparent state and an opaque state. Further example implementations of display(s) 120 include display-capable lenses, tablets, smartphones, desktop computers, laptop computers, heads up displays, display-capable automotive windshields, or display-capable windows. In some examples, system 100 is a projection-based system. For example, system 100 projects virtual objects onto a physical environment (e.g., projects a holograph onto a physical environment or projects imagery onto a physical surface). As another example, system 100 uses retinal projection to project images onto a person's eyes (e.g., retina). In some examples, system 100 can be configured to interface with an external display (e.g., a smartphone display).

Figure 2:
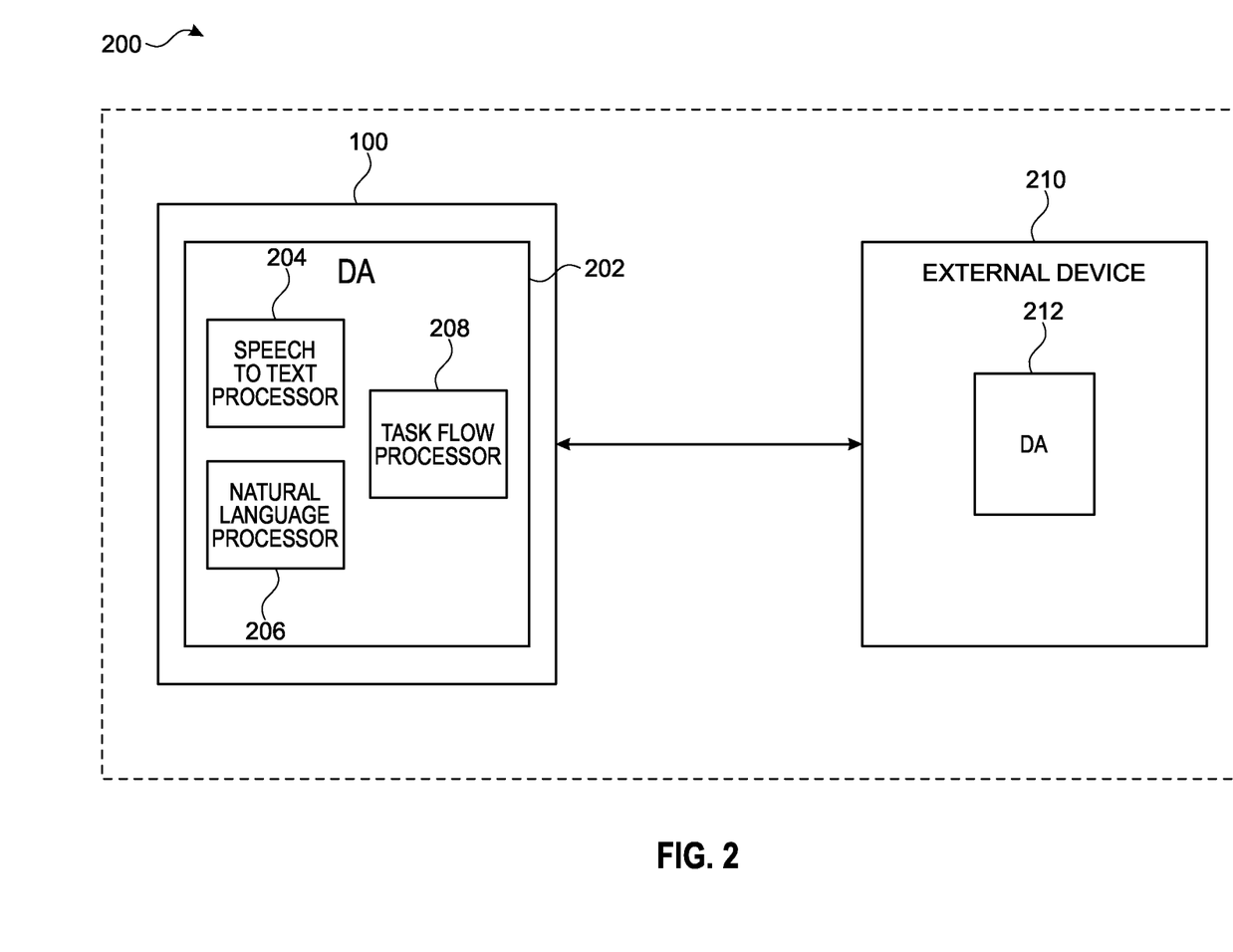
FIG. 2 illustrates a block diagram of a system for providing digital assistant interactions, according to various examples.

FIG. 2 illustrates a block diagram of system 200 for providing digital assistant (DA) interactions, according to various examples.

System 200 includes DA 202. In some examples, as shown, DA 202 is at least partially implemented within system 100, e.g., within device 100a, 100b, or 100c. For example, DA 202 is at least partially implemented as computer-executable instructions stored in memory(ies) 106. In some examples, DA 202 is distributed across multiple computers and/or systems. In some examples, some of the modules and functions of DA 202 are divided into a server portion and a client portion, where the client portion is implemented in one or more user devices (e.g., device 100a, 100b, 100c) or systems (e.g., system 100) and, optionally, communicates with the server portion via one or more networks. The various components and functions of DA 202 are implemented in hardware, software instructions for execution by one or more processors, firmware, including one or more signal processing and/or application specific integrated circuits, or a combination thereof. DA 202 is only one example of a DA, and DA 202 can have more or fewer components than shown, can combine two or more components, or can have a different configuration or arrangement of the components.

In some examples, DA 202 performs at least some of: converting speech input into text, identifying a user's intent from a received natural language input, eliciting (e.g., from the user) and obtaining information needed to fully satisfy the user's intent (e.g., by disambiguating phrases, names, etc.), determining a task flow for satisfying the identified intent, and executing the task flow.

In some examples, DA 202 includes natural language processor 206 configured to identify the user intent. Natural language processor 206 takes the candidate textual representations generated by speech-to-text (STT) processor 204, and attempts to map each of the candidate textual representations to one or more "intents" recognized by the DA. An "intent" (or "user intent") represents a DA performable task, and can have a corresponding task flow implemented in task flow processor 208. The corresponding task flow is a series of programmed actions that the DA takes for performing the task. Accordingly, in some examples, the DA's capabilities are dependent on the types of different task flows implemented in task flow processor 208, e.g., dependent on the different types of "intents" the DA recognizes.

In some examples, once natural language processor 206 identifies an intent based on the natural language input, natural language processor 206 causes task flow processor 208 to perform the actions required to satisfy the user request. For example, task flow processor 208 executes the task flow corresponding to the identified intent to perform a task to satisfy the user request. In some examples, performing the task includes providing audible, haptic, or displayed output indicating the results of the performed task.

System 200 includes device 210. Device 210 is external to a device displaying an XR environment. The architecture of external device 210 is similar or identical to that of device 100b or 100c. For example, external device 210 includes processor(s), memory(ies), RF circuitry(ies), communication bus(es), speaker(s), microphone(s), display(s), or a combination or sub-combination thereof. In some examples, external device 210 is implemented as a smart speaker. In other examples, external device 210 is implemented as a smartphone, laptop or desktop computer, tablet device, wearable device (e.g., smart watch), a smart home device (smart TV, smart appliance), or combination or sub-combination thereof. In some examples, external device 210 communicates with other devices (e.g., system 100) through a wired or wireless connection.

External device 210 implements, at least partially, DA 212. The architecture of DA 212 is similar or identical to that of DA 202. For example, while FIG. 2 shows that DA 212 is implemented on a single device (e.g., external device 210), in other examples, DA 212 is distributed across multiple computers and/or systems, e.g., as a server portion and a client portion. DA 212 is capable of performing all of the functions described above with respect to DA 202, e.g., STT conversion, natural language processing, and task flow execution.

Figure 3A:
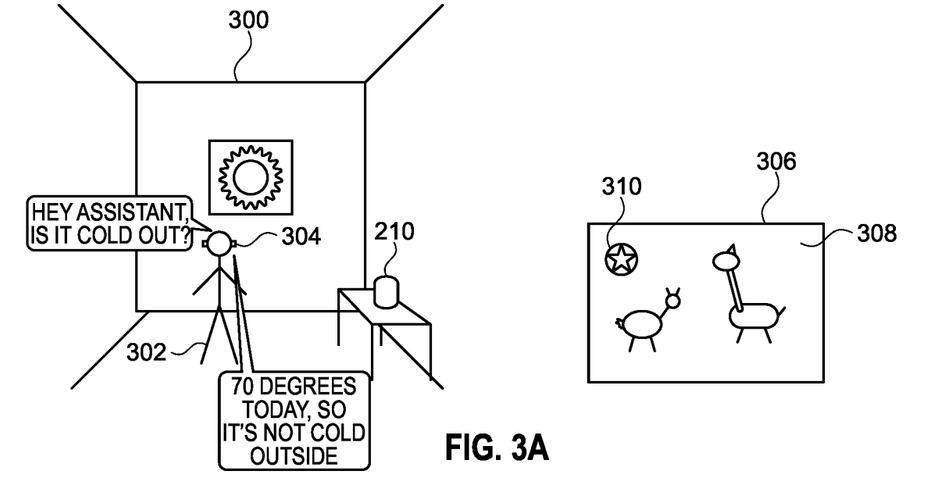
FIGS. 3A-3B illustrate digital assistant interactions within an XR environment, according to various examples.
Figure 3B:
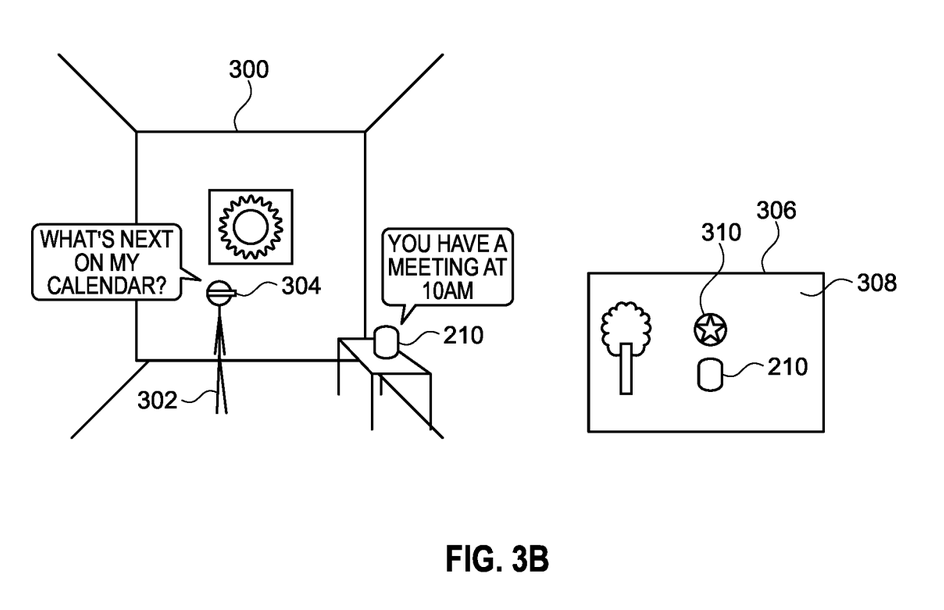

FIGS. 3A-3B illustrate DA interactions within an XR environment, according to various examples.

FIG. 3A shows user 302 immersed in an XR experience using device 304, e.g., a head mounted device worn by user 302. Device 304 is implemented as device 100*a* or 100*c*. The right panels of FIGS. 3A-3B shows display 306 of device 304, e.g., the current view of user 302.

In FIG. 3A, user 302 is located in physical environment 300, e.g., a physical room including a physical painting, a physical table, and external device 210. Although user 302 faces the front of physical environment 300, user 302 views XR environment 308 displayed on display 306.

User 302 sometimes desires to interact with a DA while immersed in the XR experience. Accordingly, user 302 provides a user input to initiate the DA. For example, in FIG. 3A, user 302 provides the spoken trigger "Hey Assistant."

In some examples, while displaying XR environment 308, device 304 receives the user input and determines whether the user input satisfies a criterion for initiating a DA. Example user input satisfying the criterion for initiating a DA include explicit triggers to initiate the DA, such as button input (e.g., input selecting a button of device 304, or input selecting the button for a predetermined duration), speech input (e.g., speech including a spoken trigger for initiating a DA, e.g., "Hey Assistant," "Wake up," and the like), gesture input (e.g., predetermined types of gestures, e.g., hand gestures, arm motions, tapping motions, and the like), motion input (e.g., motion of device 304 representing predetermined user movements, e.g., head nods, head shakes, and the like), and input received at an external device communicatively coupled to device 304 (e.g., a press of a button of the external device, input moving the external device in a predetermined manner).

In FIG. 3A, user 302 further provides a speech input including a request to the DA. For example, user 302 asks "is it cold out?" after providing the user input to initiate the DA. Device 304 samples the speech input.

In some examples, in accordance with a determination that the user input satisfies a criterion for initiating the DA, device 304 initiates the DA, e.g., DA 202. For example, device 304 displays DA indicator 310 within XR environment 308 to indicate the initiated DA. In some examples, device 304 displays DA indicator 310 at a first location of the XR environment that is visible from user 302's current pose (e.g., head pose). For example, whenever user 302 initiates a DA using an explicit trigger, device 304 displays DA indicator 310 at a same location on display 306, e.g., using the same plurality of pixels.

In some examples, initiating the DA further includes providing, by the DA, a response to the user speech input. For example, while displaying DA indicator 310 at the first location, device 304 speaks the response "70 degrees today, so it's not cold outside" to satisfy the user request.

Requiring user 302 to provide an explicit trigger to initiate each DA interaction may be burdensome, non-intuitive, and interrupt the user's XR experience. The below describes techniques for using external device 210 to initiate DA interactions without requiring user 302 to provide explicit triggers to initiate the interactions.

In some examples, after providing the response to the user speech input, device 304 ceases to display DA indicator 310 at the first location, e.g., to indicate that the current DA interaction has ended. In some examples, device 304 ceases to display DA indicator 310 automatically (e.g., without user input instructing to cease the display) at a predetermined duration after providing the response. For example, device 304 automatically ceases to display DA indicator 310 at the end of the predetermined duration in accordance with not receiving a further user request to the DA (e.g., not sampling follow-up speech input and/or not receiving another explicit trigger) before the predetermined duration elapses. In some examples, device 304 ceases to display DA indicator 310 responsive to receiving a user input representing an instruction to dismiss the display of DA indicator 310, e.g., user input to end the current DA interaction. In some examples, the user input includes gesture input (e.g., a predetermined gesture performed by user 302 to end the current DA interaction) or speech input (e.g., speech inputs such as "I'm done" or "go away now" to end the current DA interaction). For example, while device 304 displays DA indicator 310 at the first location, device 304 samples the speech input "go away," and in response, ceases to display DA indicator 310 at the first location.

In some examples, in accordance with ceasing to display DA indicator 310 at the first location, device 304 displays DA indicator 310 at a second location of XR environment 308. The second location corresponds to the physical location of external device 210, e.g., the location of external device 210 in XR environment 308 if external device 210 were displayed via pass-through video. For example, the second location is within a predetermined distance of the physical location, e.g., within a sphere defined by the predetermined distance from the physical location. As one example, the second location is directly above the physical location, e.g., is above the physical location on the vertical axis of external device 210, as shown in FIG. 3B. In this manner, device 304 may move the display of DA indicator 310 to a location known by user 302, as user 302 knows where external device 210 (e.g., the user's smart speaker) is located.

In some examples, the gesture input representing the instruction to dismiss the display of DA indicator 310 at the first location includes a drag-and-drop gesture from the first location to the second location. For example, device 304 detects a gesture input from user 302 including a press gesture (e.g., a finger press gesture) corresponding to the first location, a dragging gesture (e.g., a finger drag gesture) corresponding to movement of DA indicator 310 from the first location to the second location, and a release gesture (e.g., a finger release gesture) corresponding to the second location. In this manner, user 302 can select DA indicator 310 at the first location and move DA indicator 310 to the second location corresponding to the location of a user-selected external electronic device. Accordingly, if user 302 owns multiple external electronic devices each implementing respective DAs (e.g., a smart phone, a smart watch, multiple smart speakers), user 302 can select a particular external electronic device (e.g., external device 210) for the display of DA indicator 310.

If multiple external electronic devices (e.g., each implementing DAs) are available for the display of DA indicator 310, device 304 may consider various other criteria to select the external device corresponding to the second location, e.g., if user gesture input does not indicate the external device. For example, device 304 ranks user 302's external devices according to various criteria and selects the top-ranked device. Example criteria include external device type, whether the external device is a user-designated default device, frequency and/or recency of user interaction with a DA implemented on the external device, and location of the external device relative to device 304. For example, device 304 ranks certain external device types (e.g., smart speakers, smart home appliances) higher than other external device types (e.g., smart phones and smart watches). As another example, device 304 ranks a user-designated default external device higher than other external devices. As yet another example, device 304 ranks an external device higher if user 302 most frequently and/or most recently interacted with a DA implemented on the external device. As yet another example, device 304 ranks external devices that are physically closer to device 304 higher than external devices physically further from device 304. In some examples, device 304 considers some or all of the above-described criteria when ranking external devices, e.g., by assigning each of the above-described criteria a respective weight when ranking the external devices.

Displaying DA indicator 310 at the known (second) location, or in other words, anchoring the display of DA indicator 310 to the physical location of external device 210, can orient user 302 to physical environment 300 while the user is immersed in an XR experience. For example, viewing DA indicator 310 (e.g., in FIG. 3B) allows user 302 to determine their current physical position and orientation relative to external device 210. Displaying DA indicator 310 at the known location further indicates the availability of a DA at the known location, which may provide an efficient and intuitive manner for initiating interactions with the DA. For example, as discussed below, user 302 may simply face the DA (e.g., face the known location) and provide a spoken request to initiate a DA interaction, e.g., without providing an explicit trigger to initiate the interaction.

In some examples, device 304 displays DA indicator 310 at the second location further in accordance with determining that the second location is visible from user 302's current pose. For example, device 304 determines whether external device 210 is visible from the current pose (and thus whether the second location is visible from the current pose). In some examples, device 304 determines that external device 210 is visible from the current pose by detecting (e.g., locating) external device 210 using one or more sensors of device 304 when user 302 has the current pose. For example, device 304 detects external device 210 within a region representing (or approximating) user 302's field of view in the current pose, e.g., user 302's field of view of physical environment 300 if user 302 were not wearing device 304.

In some examples, the sensor(s) of device 304 include a camera. In some examples, device 304 analyzes image data captured by the camera to recognize external device 210 (e.g., using object recognition technologies) and locate external device 210 relative to device 304. In some examples, the sensor(s) of device 304 includes sensor(s) configured to detect external device 210 via signals emitted by external device 210 and/or device 304 (e.g., sensors using range finding technology). In some examples, device 304 analyzes the signals to locate external device 210 relative to device 304. In this manner, device 304 can detect external device 210 within particular defined regions (e.g., within a first region representing user 302's current field of view, within a narrower front-facing region representing the portion of physical environment 300 that user 302 currently faces) to determine whether the second location is visible from user 302's current pose.

In some examples, device 304 further displays, within XR environment 308, a physical representation of external device 210 at the physical location of external device 210, e.g., via pass-through video. In some examples, device 304 similarly displays the physical representation of external device 210 in accordance with determining that external device 210 is visible from user 302's current pose.

In the example of FIG. 3A, external device 210 is not visible from user 302's current pose. For example, user 302 faces the front of physical environment 300, but external device 210 is located at the right side of physical environment 300. FIG. 3B shows that user 302 has changed their pose to face (e.g., turned to face) the right side of physical environment 300. For example, after the DA interaction of FIG. 3A ends (e.g., after device 304 ceases to display DA indicator 310 at the first location), user 302 turns to face external device 210 to initiate another DA interaction.

In FIG. 3B, device 304 updates the displayed view of XR environment 308 to correspond to user 302's changed pose. Further, device 304 determines that external device 210 and the second location are visible from user 302's pose in FIG. 3B. Accordingly, device 304 displays external device 210 at its physical location and displays DA indicator 310 at the second location.

In some examples, in accordance with determining that the second location is visible from user 302's current pose, device 304 displays (e.g., continues to display) virtual elements of XR environment 308 concurrently with DA indicator 310. For example, FIG. 3B shows that device 304 modifies the view of XR environment 308 (relative to FIG. 3A) to correspond to user 302's right facing pose. The view includes a virtual tree (e.g., included in the right side of XR environment 308) in addition to DA indicator 310. In other examples, in accordance with determining that the second location is visible from user 302's current pose, device 304 displays DA indicator 310 as the only virtual element. For example, device 304 displays a view of physical environment 300 (e.g., displays the right side of the physical room via pass-through video), where the view includes DA indicator 310, but does not include any other virtual element such as the virtual tree.

In some examples, device 304 maintains the display of DA indicator 310 at the second location responsive to changes in user 302's pose. In this manner, device 304 keeps the display of DA indicator 310 anchored to the physical location of external device 210. For example, device 304 updates the display of XR environment 308 based on updates to user 302's pose, but maintains the display of DA indicator 310 at the second location while updating the display of XR environment 308. For example, if user 302 turns right in FIG. 3B, device 304 displays virtual elements to the right of the virtual tree, but keeps the display location of DA indicator 310 consistent with the physical location of external device 210, e.g., moves DA indicator 310's location on display 306 leftwards relative to FIG. 3B.

In some examples, while device 304 displays DA indicator 310 at the second location, device 304 samples a user speech input. For example, in FIG. 3B, user 302 issues a spoken request to the DA (e.g., "what's next on my calendar?") to initiate a DA interaction. The speech input does not include a spoken trigger for the DA, nor does user 302 provide any of the above-discussed explicit triggers to initiate the DA interaction.

In some examples, while device 304 displays DA indicator 310 at the second location, device 304 determines whether a pose of user 302 corresponds to (e.g., whether user 302 faces) the second location. In some examples, determining that user 302's pose corresponds to the second location includes determining that user 302's gaze is directed at the second location, e.g., at the display of DA indicator 310. For example, device 304 includes camera(s) configured to track user 302's eyes. Device 304 analyzes the captured camera data using eye tracking technologies to determine user 302's gaze direction. In some examples, determining that user 302's pose corresponds to the second location includes detecting external device 210 using one or more sensors of device 304 when user 302 has the pose. For example, as discussed above, device 304 detects external device 210 within a particular region corresponding to the pose, e.g., within a front-facing region corresponding to the pose.

In some examples, device 304 determines whether user 302's pose corresponds to the second location while sampling the user speech input. For example, device 304 determines whether user 302's pose corresponds to the second location while sampling the entirety of the speech input, while sampling a predetermined duration of the speech input, or while sampling a particular portion (e.g., start portion, middle portion, end portion) of the speech input. In some examples, in accordance with a determination that user 302's pose corresponds to the second location while sampling the user speech input, device 304 causes a response to the user speech input to be provided, e.g., by a DA.

For example, because user 302 issues the spoken request "what's next on my calendar?" while facing the second location (e.g., while facing DA indicator 310), device 304 causes a DA to respond to the request. In this manner, to initiate a DA interaction, user 302 can face a DA that appears to be present at a known location and issue a spoken request. User 302 is not required to provide an explicit trigger to initiate the interaction, as device 304 can determine user intent to interact via user pose and/or user gaze.

In some examples, causing the response to be provided includes causing a DA implemented on external device 210 to provide a response using a speaker of external device 210. For example, device 304 transmits the speech input "what's next on my calendar?" to external device 210 and instructs DA 212 to determine a response to the speech input. As shown in FIG. 3B, DA 212 determines the response "you have a meeting at 10 am" and causes external device 210 to audibly output the response.

In some examples, causing the response to be provided includes providing, by a DA implemented on device 304, the response using a speaker of device 304. For example, DA 202 (implemented on device 304) determines the response "you have a meeting at 10 am" and causes device 304's internal speaker(s) to output the response. In some examples, device 304 adjusts a characteristic of the response based on the second location and provides, using device 304's speaker(s), the adjusted response. For example, device 304 applies 3D-audio processing techniques on the response so the adjusted response appears to emanate from the location of DA indicator 310.

In some examples, device 304 ceases to display DA indicator 310 at the second location (including ceasing to display DA indicator 310 for any pose of user 302). For example, device 304 ceases to display DA indicator 310 a predetermined duration after initially displaying DA indicator 310 at the second location. For example, device 304 ceases to display DA indicator 310 if device 304 does not sample speech input to initiate a DA interaction before the predetermined duration elapses. As another example, device 304 ceases to display DA indicator 310 responsive to receiving user input representing an instruction to dismiss the DA. Example user input includes speech input to dismiss the DA (e.g., "go away" or "I'm done"), button input to dismiss the DA, gesture input (e.g., predetermined gestures performed by user 302 to dismiss the DA, and motion input (e.g., predetermined motions detected by device 304 to dismiss the DA). In this manner, the DA can be dismissed, e.g., by entirely ceasing the display of DA indicator 310, regardless of user 302's pose.

In some examples, after ceasing to display DA indicator 310 at the second location (e.g., dismissing the DA), device 304 receives a user input. In some examples, in accordance with a determination that the user input satisfies the criterion for initiating the DA, device 304 displays (e.g., displays again) DA indicator 310 at the second location, e.g., if the second location is visible from user 302's current pose. For example, device 304 displays DA indicator 310 at the second location without first displaying DA indicator 310 at any other location. In this manner, if user 302 provides an explicit trigger to re-initiate the DA after DA dismissal, the display of DA indicator 310 remains anchored to the physical location of external device 210, thereby enabling initiation of future DA interactions without an explicit trigger.

Figure 4:
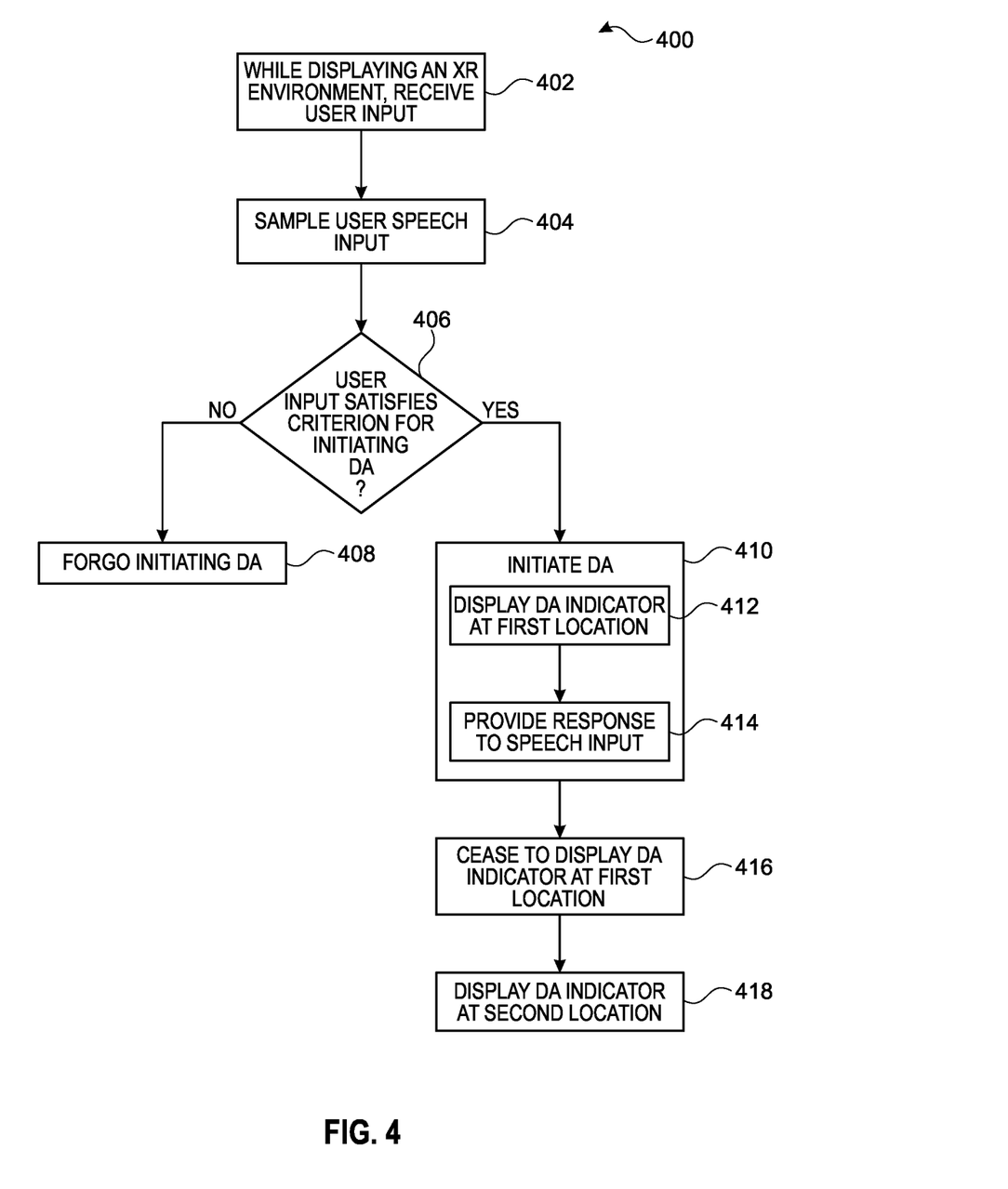
FIG. 4 is a flow diagram illustrating a process for digital assistant interaction, according to various examples.

FIG. 4 is a flow diagram illustrating process 400 for digital assistant interaction, according to various examples. Process 400 is performed, for example, at a device (e.g., device 304) and using system 200. In process 400, some operations are, optionally, combined, the orders of some operations are, optionally, changed, and some operations are, optionally, omitted. In some examples, additional operations are performed in combination with process 400.

In some examples, at block 402, while displaying, on a display of an electronic device (e.g., display 306 of device 304), an extended reality (XR) environment, a user input is received from a user.

In some examples, at block 404, while displaying the XR environment, a user speech input is sampled with a microphone of the electronic device.

In some examples, at block 406, it is determined whether the user input satisfies a criterion for initiating a digital assistant. In some examples, the user input satisfies the criterion for initiating the digital assistant if the user input includes a spoken trigger for the digital assistant.

In some examples, at block 408, in accordance with a determination that the user input does not satisfy the criterion for initiating the digital assistant, initiating the digital assistant is foregone.

In some examples, at block 410, in accordance with a determination that the user input satisfies the criterion for initiating the digital assistant, the digital assistant is initiated. In some examples, initiating the digital assistant includes displaying, within the XR environment, a digital assistant indicator (e.g., DA indicator 310) at a first location of the XR environment, as shown at block 412. In some examples, initiating the digital assistant includes, while displaying the digital assistant indicator at the first location, providing, by the digital assistant, a response to the user speech input, as shown at block 414.

In some examples, at block 416, after providing the response, display of the digital assistant indicator at the first location is ceased. In some examples, ceasing to display the digital assistant indicator at the first location is performed automatically at a predetermined duration after providing the response. In some examples, after providing the response and while displaying the digital assistant indicator at the first location, a second user input representing an instruction to dismiss the display of the digital assistant indicator at the first location is received. In some examples, ceasing to display the digital assistant indicator at the first location is performed responsive to receiving the second user input. In some examples, the second user input includes gesture input or speech input.

In some examples, at block 418, in accordance with ceasing to display the digital assistant indicator at the first location, the digital assistant indicator is displayed at a second location of the XR environment. The second location corresponds to a physical location of an external electronic device (e.g., external device 210) implementing a second digital assistant (e.g., DA 212). In some examples, the second location is above the physical location of the external electronic device and defined by the vertical axis of the external electronic device. In some examples, displaying the digital assistant indicator at the second location is performed in accordance with a determination that the second location is visible from a current pose of the user.

In some examples, the display of the XR environment is updated based on an updated pose of the user. In some examples, displaying the digital assistant indicator at the second location includes maintaining the display of the digital assistant indicator at the second location while updating the display of the XR environment.

In some examples, a physical representation of the external electronic device is displayed within the XR environment at the physical location. In some examples, a pose (e.g., head pose) of the user is determined (e.g., by device 304) and it is determined whether the external electronic device is visible from the determined pose. In some examples, displaying the physical representation of the external electronic device is performed in accordance with a determination that the external electronic device is visible from the determined pose. In some examples, determining that the external electronic device is visible from the determined pose includes detecting the external electronic device using one or more sensors of the electronic device when the user has the determined pose.

In some examples, while the digital assistant indicator is displayed at the second location, it is determined that a second pose of the user corresponds to the second location and a second user speech input is sampled with the microphone. In some examples, the second user speech input does not include a spoken trigger for the digital assistant. In some examples, determining that the second pose corresponds to the second location includes determining that a user gaze is directed at the second location. In some examples, determining that the second pose corresponds to the second location includes detecting the external electronic device using one or more sensors of the electronic device when the user has the second pose.

In some examples, in accordance with a determination that the second pose corresponds to the second location while sampling the second user speech input, a second response to the second user speech input is caused to be provided.

In some examples, causing the second response be provided includes causing the second digital assistant to provide the second response using a speaker of the external electronic device. In some examples, causing the second response be provided includes providing, by the digital assistant, the second response using a speaker of the electronic device. In some examples, providing, by the digital assistant, the second response includes: adjusting a characteristic of the second response based on the second location to obtain an adjusted response; and providing, using the speaker, the adjusted response.

In some examples, display of the digital assistant indicator at the second location is ceased. In some examples, after ceasing to display the digital assistant indicator at the second location: a third user input is received; and in accordance with a determination that the third user input satisfies the criterion for initiating the digital assistant, the digital assistant indicator is displayed at the second location.

The operations discussed above with respect to FIG. 4 are optionally implemented by the components depicted in FIG. 2, e.g., by system 100, DA 202, external device 210, and DA 212.

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

Various processes described herein contemplate the option of obtaining and using a user's personal information. For example, such personal information can be used to provide efficient DA interactions. However, if such personal information is obtained, such information should be obtained with the user's informed consent. Specifically, the user should have knowledge of and control over how devices use their personal information.

Appropriate parties will use personal information only for reasonable and legitimate purposes. These parties will abide by privacy policies and practices that at least comply with appropriate laws and regulations. Further, such policies should be user-accessible, well-established, and recognized as compliant with (or to exceed) governmental/industry standards. Additionally, these parties will not sell, distribute, or otherwise share personal information for any unreasonable or illegitimate purposes.

Users may also limit the degree to which such parties may access or otherwise obtain personal information. For instance, user settings or other preferences can be changed to allow users to decide whether their personal information is accessible by various entities. Furthermore, while some features described herein are described to include use of personal information, various aspects of these features may be implemented without needing use of such information. For example, if user location history is collected, this information can be obscured or otherwise generalized such that the information does not identify the corresponding user.

What is claimed is:

1. A non-transitory computer-readable storage medium storing one or more programs, the one or more programs comprising instructions, which when executed by one or more processors of an electronic device having a display and a microphone, cause the electronic device to:
while displaying, on the display, an extended reality (XR) environment:
receive, from a user, a user input;
sample, with the microphone, a user speech input;
in accordance with a determination that the user input satisfies a criterion for initiating a digital assistant, initiate the digital assistant, including:
displaying, within the XR environment, a digital assistant indicator at a first location of the XR environment; and
while displaying the digital assistant indicator at the first location, provide, by the digital assistant, a response to the user speech input;
after providing the response, cease to display the digital assistant indicator at the first location;
in accordance with ceasing to display the digital assistant indicator at the first location, display the digital assistant indicator at a second location of the XR environment, the second location corresponding to a physical location of an external electronic device implementing a second digital assistant;
while displaying the digital assistant indicator at the second location:
determine that a pose of the user corresponds to the second location; and
sample, with the microphone, a second user speech input; and
in accordance with a determination that the pose corresponds to the second location while sampling the second user speech input, cause a second response to the second user speech input to be provided.

2. The non-transitory computer-readable storage medium of claim 1, wherein the user input satisfies the criterion for initiating the digital assistant if the user input includes a spoken trigger for the digital assistant.

3. The non-transitory computer-readable storage medium of claim 1, wherein ceasing to display the digital assistant indicator at the first location is performed automatically at a predetermined duration after providing the response.

4. The non-transitory computer-readable storage medium of claim 1, wherein the one or more programs further include instructions, which when executed by the one or more processors, cause the electronic device to:
after providing the response and while displaying the digital assistant indicator at the first location, receive a second user input representing an instruction to dismiss the display of the digital assistant indicator at the first location, wherein ceasing to display the digital assistant indicator at the first location is performed responsive to receiving the second user input.

5. The non-transitory computer-readable storage medium of claim 4, wherein the second user input includes gesture input or speech input.

6. The non-transitory computer-readable storage medium of claim 1, wherein displaying the digital assistant indicator at the second location is performed in accordance with a determination that the second location is visible from a current pose of the user.

7. The non-transitory computer-readable storage medium of claim 1, wherein the one or more programs further include instructions, which when executed by the one or more processors, cause the electronic device to:
display, within the XR environment, a physical representation of the external electronic device at the physical location.

8. The non-transitory computer-readable storage medium of claim 7, wherein the one or more programs further include instructions, which when executed by the one or more processors, cause the electronic device to:
determine a second pose of the user; and
determine whether the external electronic device is visible from the determined second pose, wherein displaying the physical representation of the external electronic device is performed in accordance with a determination that the external electronic device is visible from the determined second pose.

9. The non-transitory computer-readable storage medium of claim 8, wherein determining that the external electronic device is visible from the determined second pose includes detecting the external electronic device using one or more sensors of the electronic device when the user has the determined second pose.

10. The non-transitory computer-readable storage medium of claim 1, wherein the second location is above the physical location of the external electronic device and defined by the vertical axis of the external electronic device.

11. The non-transitory computer-readable storage medium of claim 1, wherein causing the second response to be provided includes causing the second digital assistant to provide the second response using a speaker of the external electronic device.

12. The non-transitory computer-readable storage medium of claim 1, wherein causing the second response to be provided includes providing, by the digital assistant, the second response using a speaker of the electronic device.

13. The non-transitory computer-readable storage medium of claim 12, wherein providing, by the digital assistant, the second response includes:
adjusting a characteristic of the second response based on the second location to obtain an adjusted response; and
providing, using the speaker, the adjusted response.

14. The non-transitory computer-readable storage medium of claim 1, wherein the second user speech input does not include a spoken trigger for the digital assistant.

15. The non-transitory computer-readable storage medium of claim 1, wherein determining that the pose corresponds to the second location includes determining that a user gaze is directed at the second location.

16. The non-transitory computer-readable storage medium of claim 1, wherein determining that the pose corresponds to the second location includes detecting the external electronic device using one or more sensors of the electronic device when the user has the pose.

17. The non-transitory computer-readable storage medium of claim 1, wherein the one or more programs further include instructions, which when executed by the one or more processors, cause the electronic device to:
cease to display the digital assistant indicator at the second location; and after ceasing to display the digital assistant indicator at the second location:
  receive a third user input; and
  in accordance with a determination that the third user input satisfies the criterion for initiating the digital assistant, display the digital assistant indicator at the second location.

18. The non-transitory computer-readable storage medium of claim 1, wherein the one or more programs further include instructions, which when executed by the one or more processors, cause the electronic device to:
  update the display of the XR environment based on an updated pose of the user; and
  wherein displaying the digital assistant indicator at the second location includes maintaining the display of the digital assistant indicator at the second location while updating the display of the XR environment.

19. An electronic device comprising:
  a display;
  a microphone;
  one or more processors;
  a memory; and
  one or more programs, wherein the one or more programs are stored in the memory and configured to be executed by the one or more processors, the one or more programs including instructions for:
    while displaying, on the display, an extended reality (XR) environment:
      receiving, from a user, a user input;
      sampling, with the microphone, a user speech input;
      in accordance with a determination that the user input satisfies a criterion for initiating a digital assistant, initiating the digital assistant, including:
        displaying, within the XR environment, a digital assistant indicator at a first location of the XR environment; and
        while displaying the digital assistant indicator at the first location, providing, by the digital assistant, a response to the user speech input;
      after providing the response, ceasing to display the digital assistant indicator at the first location;
      in accordance with ceasing to display the digital assistant indicator at the first location, displaying the digital assistant indicator at a second location of the XR environment, the second location corresponding to a physical location of an external electronic device implementing a second digital assistant;
      while displaying the digital assistant indicator at the second location:
        determining that a pose of the user corresponds to the second location; and
        sampling, with the microphone, a second user speech input; and
        in accordance with a determination that the pose corresponds to the second location while sampling the second user speech input, causing a second response to the second user speech input to be provided.

20. The electronic device of claim 19, wherein the user input satisfies the criterion for initiating the digital assistant if the user input includes a spoken trigger for the digital assistant.

21. The electronic device of claim 19, wherein ceasing to display the digital assistant indicator at the first location is performed automatically at a predetermined duration after providing the response.

22. The electronic device of claim 19, wherein the one or more programs further include instructions for:
  after providing the response and while displaying the digital assistant indicator at the first location, receiving a second user input representing an instruction to dismiss the display of the digital assistant indicator at the first location, wherein ceasing to display the digital assistant indicator at the first location is performed responsive to receiving the second user input.

23. The electronic device of claim 19, wherein the one or more programs further include instructions for:
  displaying, within the XR environment, a physical representation of the external electronic device at the physical location.

24. The electronic device of claim 19, wherein causing the second response to be provided includes causing the second digital assistant to provide the second response using a speaker of the external electronic device.

25. The electronic device of claim 19, wherein causing the second response to be provided includes providing, by the digital assistant, the second response using a speaker of the electronic device.

26. The electronic device of claim 25, wherein providing, by the digital assistant, the second response includes:
  adjusting a characteristic of the second response based on the second location to obtain an adjusted response; and
  providing, using the speaker, the adjusted response.

27. The electronic device of claim 19, wherein the second user speech input does not include a spoken trigger for the digital assistant.

28. The electronic device of claim 19, wherein determining that the pose corresponds to the second location includes determining that a user gaze is directed at the second location.

29. The electronic device of claim 19, wherein determining that the pose corresponds to the second location includes detecting the external electronic device using one or more sensors of the electronic device when the user has the pose.

30. The electronic device of claim 19, wherein the one or more programs further include instructions for:
  ceasing to display the digital assistant indicator at the second location; and
  after ceasing to display the digital assistant indicator at the second location:
    receiving a third user input; and
    in accordance with a determination that the third user input satisfies the criterion for initiating the digital assistant, displaying the digital assistant indicator at the second location.

31. The electronic device of claim 19, wherein the one or more programs further include instructions for:
  updating the display of the XR environment based on an updated pose of the user; and
  wherein displaying the digital assistant indicator at the second location includes maintaining the display of the digital assistant indicator at the second location while updating the display of the XR environment.

32. A method, comprising:
  at an electronic device having one or more processors, memory, a microphone, and a display:
    while displaying, on the display, an extended reality (XR) environment:
      receiving, from a user, a user input;
      sampling, with the microphone, a user speech input;
      in accordance with a determination that the user input satisfies a criterion for initiating a digital assistant, initiating the digital assistant, including:

displaying, within the XR environment, a digital assistant indicator at a first location of the XR environment; and while displaying the digital assistant indicator at the first location, providing, by the digital assistant, a response to the user speech input;

after providing the response, ceasing to display the digital assistant indicator at the first location;

in accordance with ceasing to display the digital assistant indicator at the first location, displaying the digital assistant indicator at a second location of the XR environment, the second location corresponding to a physical location of an external electronic device implementing a second digital assistant;

while displaying the digital assistant indicator at the second location:
- determining that a pose of the user corresponds to the second location; and
- sampling, with the microphone, a second user speech input; and in accordance with a determination that the pose corresponds to the second location while sampling the second user speech input, causing a second response to the second user speech input to be provided.

33. The method of claim 32, wherein the user input satisfies the criterion for initiating the digital assistant if the user input includes a spoken trigger for the digital assistant.

34. The method of claim 32, wherein ceasing to display the digital assistant indicator at the first location is performed automatically at a predetermined duration after providing the response.

35. The method of claim 32, further comprising:
after providing the response and while displaying the digital assistant indicator at the first location, receiving a second user input representing an instruction to dismiss the display of the digital assistant indicator at the first location, wherein ceasing to display the digital assistant indicator at the first location is performed responsive to receiving the second user input.

36. The method of claim 32, further comprising:
displaying, within the XR environment, a physical representation of the external electronic device at the physical location.

37. The method of claim 32, wherein causing the second response to be provided includes causing the second digital assistant to provide the second response using a speaker of the external electronic device.

38. The method of claim 32, wherein causing the second response to be provided includes providing, by the digital assistant, the second response using a speaker of the electronic device.

39. The method of claim 38, wherein providing, by the digital assistant, the second response includes:
adjusting a characteristic of the second response based on the second location to obtain an adjusted response; and
providing, using the speaker, the adjusted response.

40. The method of claim 32, wherein the second user speech input does not include a spoken trigger for the digital assistant.

41. The method of claim 32, wherein determining that the pose corresponds to the second location includes determining that a user gaze is directed at the second location.

42. The method of claim 32, wherein determining that the pose corresponds to the second location includes detecting the external electronic device using one or more sensors of the electronic device when the user has the pose.

43. The method of claim 32, further comprising:
ceasing to display the digital assistant indicator at the second location; and
after ceasing to display the digital assistant indicator at the second location:
receiving a third user input; and
in accordance with a determination that the third user input satisfies the criterion for initiating the digital assistant, displaying the digital assistant indicator at the second location.

44. The method of claim 32, further comprising:
updating the display of the XR environment based on an updated pose of the user; and
wherein displaying the digital assistant indicator at the second location includes maintaining the display of the digital assistant indicator at the second location while updating the display of the XR environment.

* * * * *